US008901505B2

(12) United States Patent
Kobayashi et al.

(10) Patent No.: US 8,901,505 B2
(45) Date of Patent: Dec. 2, 2014

(54) CASSETTE FOR RADIOGRAPHIC IMAGING

(75) Inventors: Takeyasu Kobayashi, Kanagawa (JP); Akihito Bettouyashiki, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 294 days.

(21) Appl. No.: 13/600,023

(22) Filed: Aug. 30, 2012

(65) Prior Publication Data

US 2013/0083900 A1 Apr. 4, 2013

(30) Foreign Application Priority Data

Sep. 29, 2011 (JP) ................................. 2011-215632

(51) Int. Cl.
*G01T 1/20* (2006.01)
*G03B 42/04* (2006.01)
*G01T 1/24* (2006.01)

(52) U.S. Cl.
CPC ............... *G01T 1/2018* (2013.01); *G01T 1/244* (2013.01); *G03B 42/04* (2013.01)
USPC .................. 250/370.09; 250/370.08; 250/582; 250/369; 250/589; 378/189; 378/91

(58) Field of Classification Search
CPC .. A61B 6/4283; A61B 6/4233; A61B 6/4208; A61B 6/4225; A61B 6/4488; A61B 6/56; A61B 6/563; A61B 6/00; A61B 6/4291; A61B 6/4423; A61B 6/4464; G01T 1/17; G01T 1/2006; G01T 1/2018; G01T 1/243; G03B 42/02; G03B 42/04; G03B 42/025
USPC ............... 250/370.09, 370.08, 582, 369, 589; 378/91, 189
See application file for complete search history.

(56) References Cited

U.S. PATENT DOCUMENTS 6,818,905 B2 * 11/2004 Yonekawa ................. 250/484.4
7,495,226 B2 * 2/2009 Jadrich et al. ............ 250/370.09
7,622,194 B2 * 11/2009 Ibuki ............................ 428/447

(Continued)

FOREIGN PATENT DOCUMENTS

JP 06/206225 A 7/1994
JP 2007/334027 A 12/2007

(Continued)

OTHER PUBLICATIONS

Japanese Office Action issued by JPO on Aug. 27, 2013, in connection with corresponding Japanese Patent Application No. 2011-215632.

*Primary Examiner* — David A Vanore
(74) *Attorney, Agent, or Firm* — Jean C. Edwards, Esq.; Edwards Neils PLLC

(57) ABSTRACT

A cassette for radiographic imaging includes a radiological image recording medium that detects radiation, a base portion that supports the radiological image recording medium, and a case that accommodates the radiological image recording medium and the base portion. The case includes a front member and a back member. The front member includes a top plate part to which radiation is incident and a side wall part which is vertically formed around an entire circumference of the edges of the top plate part, where the top plate part and the side wall part are integrally formed by the same material. The back member is configured to close a bottom part opening of the front member. The base portion is fixed to the front member.

17 Claims, 9 Drawing Sheets

(56) References Cited

U.S. PATENT DOCUMENTS

| | | | |
|---|---|---|---|
| 7,798,630 B2* | 9/2010 | Nakazawa | 347/102 |
| 7,842,928 B2* | 11/2010 | Jadrich et al. | 250/370.11 |
| 7,985,527 B2* | 7/2011 | Tokunaga | 430/270.1 |
| 7,989,773 B2* | 8/2011 | Jadrich et al. | 250/370.09 |
| 8,133,377 B2* | 3/2012 | Okazaki et al. | 205/219 |
| 8,149,116 B2* | 4/2012 | Nishino et al. | 340/540 |
| 8,389,944 B2* | 3/2013 | Jadrich et al. | 250/370.11 |
| 8,426,749 B2* | 4/2013 | Saneto et al. | 174/381 |
| 8,471,212 B2* | 6/2013 | Nakatsugawa et al. | 250/366 |
| 8,541,751 B2* | 9/2013 | Nishino et al. | 250/370.11 |
| 8,558,184 B2* | 10/2013 | Nakatsugawa et al. | 250/369 |
| 8,591,106 B2* | 11/2013 | Nishino et al. | 378/189 |
| 8,796,623 B2* | 8/2014 | Nakatsugawa et al. | 250/336.1 |
| 2003/0066973 A1* | 4/2003 | Misawa et al. | 250/484.4 |
| 2007/0272873 A1* | 11/2007 | Jadrich et al. | 250/370.11 |
| 2009/0122959 A1* | 5/2009 | Jadrich et al. | 378/91 |
| 2011/0042574 A1* | 2/2011 | Nishino et al. | 250/370.08 |
| 2013/0003932 A1* | 1/2013 | Nishino | 378/91 |
| 2013/0083897 A1* | 4/2013 | Ohta et al. | 378/91 |
| 2013/0092840 A1* | 4/2013 | Ohta et al. | 250/361 R |
| 2013/0099129 A1* | 4/2013 | Sato | 250/394 |
| 2013/0099130 A1* | 4/2013 | Nakahashi et al. | 250/394 |
| 2013/0134316 A1* | 5/2013 | Nakatsugawa et al. | 250/366 |

FOREIGN PATENT DOCUMENTS

| | | |
|---|---|---|
| JP | 2009/234202 A | 10/2009 |
| JP | 2009-300757 A | 12/2009 |
| JP | 2010-039267 A | 2/2010 |
| JP | 2010/276687 A | 12/2010 |
| JP | 2011-058999 A | 3/2011 |

\* cited by examiner

CASSETTE FOR RADIOGRAPHIC IMAGING

CROSS-REFERENCE TO RELATED APPLICATIONS

This application claims the benefit of Japanese Patent Application No. 2011-215632 (filed on Sep. 29, 2011), the entire contents of which are hereby incorporated by reference.

BACKGROUND

1. Technical Field

The present invention relates to a cassette for radiographic imaging.

2. Related Art

An X-ray imaging has been widely used in the fields of medical diagnosis or nondestructive inspection. In a general X-ray imaging, X-rays are irradiated to a subject and attenuated at each part of the subject. Then, X-rays transmitted through the subject are detected to obtain X-ray images based on the intensity distributions of X-rays.

As an X-ray image recording medium, there have been used, for example, a combination of an intensifying screen which generates fluorescence when exposed to X-rays and a film photosensitive to the fluorescence, or a photostimulable phosphor (accumulative phosphor) panel which accumulates the intensity distributions of X-rays as latent images when exposed to X-rays, and emits fluorescence in accordance with the latent images by subsequent irradiation of excitation light such as laser.

Recently, a flat panel detector (FPD) has also been used as an X-ray image recording medium, which generates digital image data by using a semiconductor device that detects an X-ray and converts the detected X-ray into an electric signal.

Further, a so-called cassette configured to accommodate the X-ray image recording medium in a portable case has been widely used in an X-ray imaging.

Such cassettes are frequently exposed to load or impact due to the form of usage. Further, since the radiological conversion panel, electronic parts and circuit board, which are precision electronic instruments, are accommodated in the cassette, the structure of the case should be configured such that an external load has no effect on the radiological conversion panel, electronic parts and circuit board. Further, in addition to having rigidity (impact resistance) against external load, the case is also required to be light weight and thin.

In order to protect the X-ray image recording medium from load or impact, a buffer material is provided, for example, in a gap between the case and X-ray image recording medium.

Moreover, a case that accommodates X-ray image recording medium is constituted with, for example, a top plate part and a bottom plate part which have a substantially rectangular shape, and a frame member which is attached thereto. The cassette described in JP-A-2010-039267 and JP-A-2009-300757 employs a case structure that enhances robustness.

In the cassette described in JP-A-2010-039267, the case is constituted with a front member including a top plate part which has a substantially rectangular shape and a frame part which is vertically formed on four side edges of the top plate part, and a back member which closes a bottom part opening of the front member. Further, it has been suggested that a top plate part and a frame part that constitute a front member are integrally formed by a resin material, and as a result, the strength of a front member is enhanced, thereby preventing deformation while suppressing the load increase.

In the cassette disclosed in JP-A-2010-039267, a top plate part and a frame part of a front member are integrally formed. With this arrangement, while the overall bending rigidity and torsional rigidity of the front member are increased, the warpage of the top plate part on which the load of the subject is imposed is not suppressed sufficiently. Further, by the warpage of the top plate part, the load or impact may be imposed on X-ray image recording medium disposed to oppose the top plate part.

In consideration of the above circumstances, an object of the present invention is to provide a cassette for radiographic imaging having an excellent load carrying capacity and impact resistance.

SUMMARY OF INVENTION (1) According to an aspect of the invention, a cassette for radiographic imaging, includes a radiological image recording medium that detects radiation, a base portion that supports the radiological image recording medium, and a case that accommodates the radiological image recording medium and the base portion. The case includes a front member and a back member. The front member includes a top plate part to which radiation is incident and a side wall part which is vertically formed around an entire circumference of the edges of the top plate part, where the top plate part and the side wall part are integrally formed by the same material. The back member is configured to close a bottom part opening of the front member. The base portion is fixed to the front member.

(2) According to another aspect of the invention, a cassette for radiographic imaging, includes a radiological image recording medium that detects radiation, a base portion that supports the radiological image recording medium, and a case that accommodates the radiological image recording medium and the base portion. The case includes a front member and a back member. The front member includes a top plate part to which radiation is incident and a side wall part which is vertically formed around an entire circumference of the edges of the top plate part, where the top plate part and the side wall part are integrally formed by the same material. The back member is configured to close a bottom part opening of the front member. The base portion is fixed to the top plate part.

According to the present invention, in the front member of the cassette for radiographic imaging, a top plate part and a side wall part are integrally formed by the same material, and a base is fixed to the front member supporting a radiological image recording medium. As a result, both the bending rigidity and torsional rigidity of the front member are improved, and the warpage of the top plate part is suppressed, thereby increasing load carrying capacity and impact resistance of the case. Accordingly, it is ensured that the radiological image recording medium accommodated in the case is protected.

DETAILED DESCRIPTION

Hereinafter, embodiments of the present invention will be described in detail with reference to the accompanying drawings.

Figure 1:
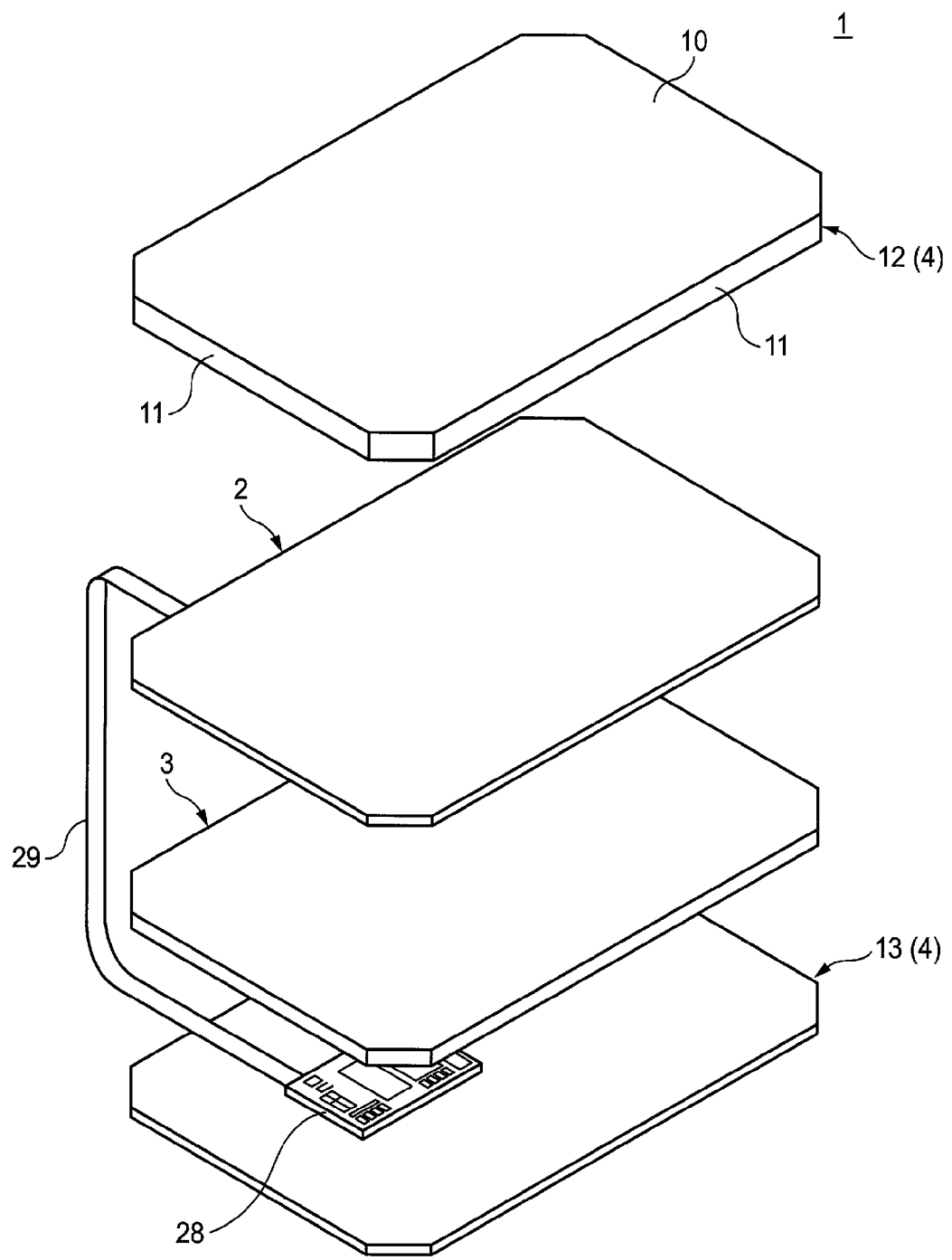
FIG. 1 is an exploded view schematically illustrating the configuration of a cassette for radiographic imaging according to an exemplary embodiment of the present invention.

FIG. 1 is an exploded view illustrating the configuration of a cassette for radiographic imaging according to an exemplary embodiment of the present invention.

A cassette for radiographic imaging 1 is provided with an FPD 2 serving as an image recording medium, a base 3 configured to support the FPD 2, a battery pack (not shown) configured to supply an operating power to the FPD 2, and a case 4 where the FPD 2 and the base 3 are accommodated and the battery pack is mounted as well.

The case 4 is constituted with a front member 12 having a substantially rectangular top plate part 10, and a frame-shaped side wall part 11 vertically formed on four side edges of the top plate part 10, and a back member 13 closing a bottom part opening of the front member 12. As the front member 12 and the back member 13 are combined with each other, a box-shape closed space which is light-shielded is formed. The FPD 2 and the base 3 are accommodated in the closed space.

X-rays transmitted through a subject are transmitted through the top plate part 10 of the front member 12, to be incident to the FPD 2 accommodated inside the case. The top plate part 10 may be typically made of a light metal material such as aluminum or magnesium in consideration of strength-to-weight ratio and the like. However, a resin material such as carbon fiber reinforced plastics (CFRP) having a better X-ray transmissivity than the light weight material may be suitably used.

Further, in the cassette for radiographic imaging 1 of the present example, the side wall part 11 of the front member 12 and the top plate part 10 are integrally formed by the same material, and as a result, the strength of the front member 12 is improved, and specifically, the torsional resistance of the top plate part 10 is improved.

When aluminum or magnesium is used as a material to form the top plate part 10 and the side wall part 11 as described above, the top plate part 10 and the side wall part 11 are integrally formed, for example, by die cast molding. Further, when CFRP is used, the top plate part 10 and the side wall part 11 are integrally formed by compression molding, injection molding or injection pressure molding.

As the top plate part 10 and the side wall part 11 are formed integrally, it is easy to perform chamfering on each of the four corner portions of the front member 12, as in the illustrated example. Further, it is also easy to perform chamfering on the corner portions which are formed by the surface of the top plate part 10 and the surface of the side wall part 11. When the cassette is interposed between a bed and a subject (patient) lying on their side thereon, the chamfered edge prevents the cassette from catching on the subject.

In consideration of strength-to-weight ratio, the back member 13 may be formed, for example, of a light metal material such as aluminum or magnesium, or a resin material such as CFRP, and is preferably formed by the same material as that of the front member 12. As the front member 12 and the back member 13 are formed of the same material, it is possible to have the same rate of expansion, and prevent the warpage of the cassette for radiographic imaging 1.

Figure 2:
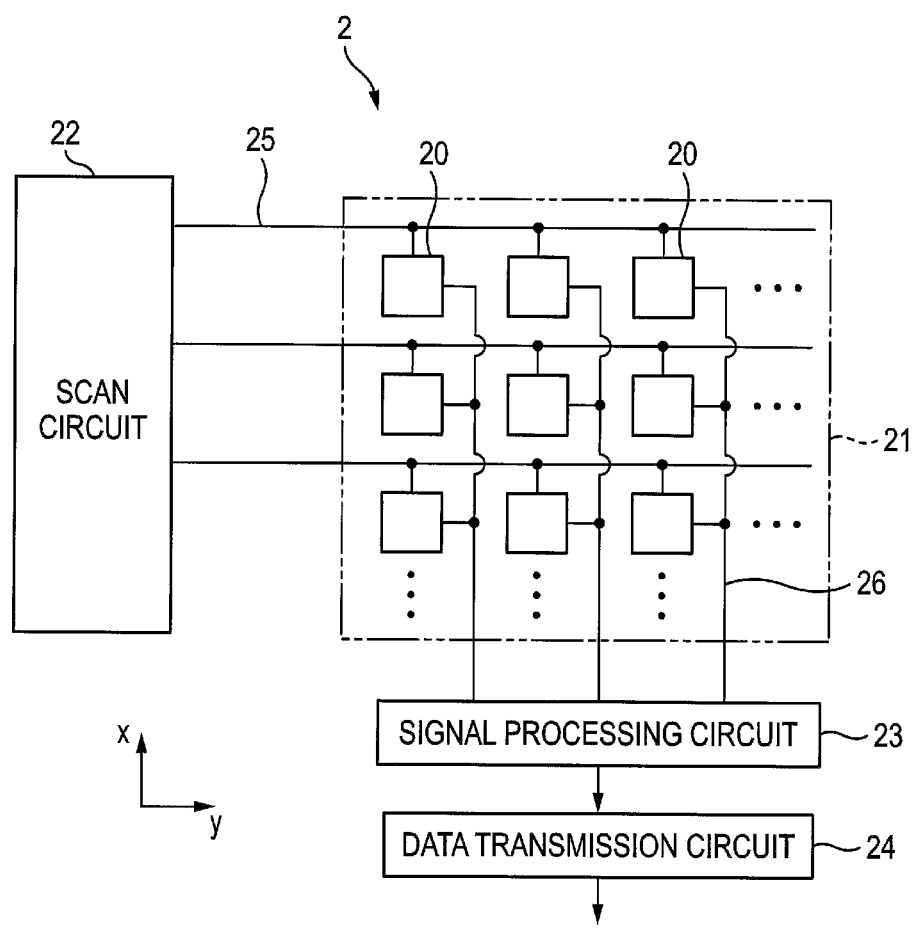
FIG. 2 is a view illustrating the configuration of a flat panel detector (FPD).

FIG. 2 illustrates the configuration of an FPD 2.

The FPD 2 includes: an image receiving unit 21 where a plurality of pixels 20, which convert X-rays into electric charge and accumulate the converted electric charge, are two-dimensionally arranged on a thin film transistor (TFT) array substrate of an active matrix type; a scan circuit 22 that controls a read timing of electric charge from the image receiving unit 21; a signal processing circuit 23 that reads the electric charge accumulated in each of the pixels 20 and converts the read electric charge into image data for recording; and a data transmission circuit 24 that transmits image data to an external device. The scan circuit 22 is connected to each of the pixels by a scan line 25 in every row, and a signal processing circuit 23 is connected to each of the pixels 20 by a signal line 26 in every column.

Each of the pixels 20 may be configured as a direct-conversion device which directly converts X-rays into the electric charge in a conversion layer (not shown) such as amorphous selenium to thereby accumulate the converted electric charge in a capacitor connected to an electrode in a lower portion of the conversion layer. Further, each of the pixels may also be configured as an indirect conversion X-ray detector which converts X-rays into visible light first using a scintillator (not shown) made of gadolinium oxide ($Gd_2O_3$), or cesium iodide (CsI) to thereby convert the converted visible light into electric charge using a photodiode (not shown) and accumulate the converted electric charge.

A TFT switch element (not shown) is connected to each of the pixels 20, and a gate electrode of the TFT switch element is connected to the scan line 25, a source electrode thereof is connected to the capacitor, and a drain electrode thereof is connected to the signal line 26. Once the TFT switch element is turned ON by a driving pulse from the scan circuit, the electric charge accumulated in the capacitor is read out in the signal line.

The signal processing circuit 23 is constituted with an integral amplification circuit, an A/D converter, a correction circuit and a video memory (not shown). The integrating amplifier circuit integrates electric charge output via the signal line from each of the pixels, converts the electric charge into voltage signal (image signal), and inputs the converted voltage signal to the A/D converter. The A/D converter converts the input image signal into digital image data to input the signal into the correction circuit. The correction circuit performs a correction, such as an offset correction or a gain correction, to image data, and records the corrected image data in the video memory.

Each of the pixels and each of the circuits as described above are supplied with an operating power from a power drive part including the battery pack.

Figure 3:
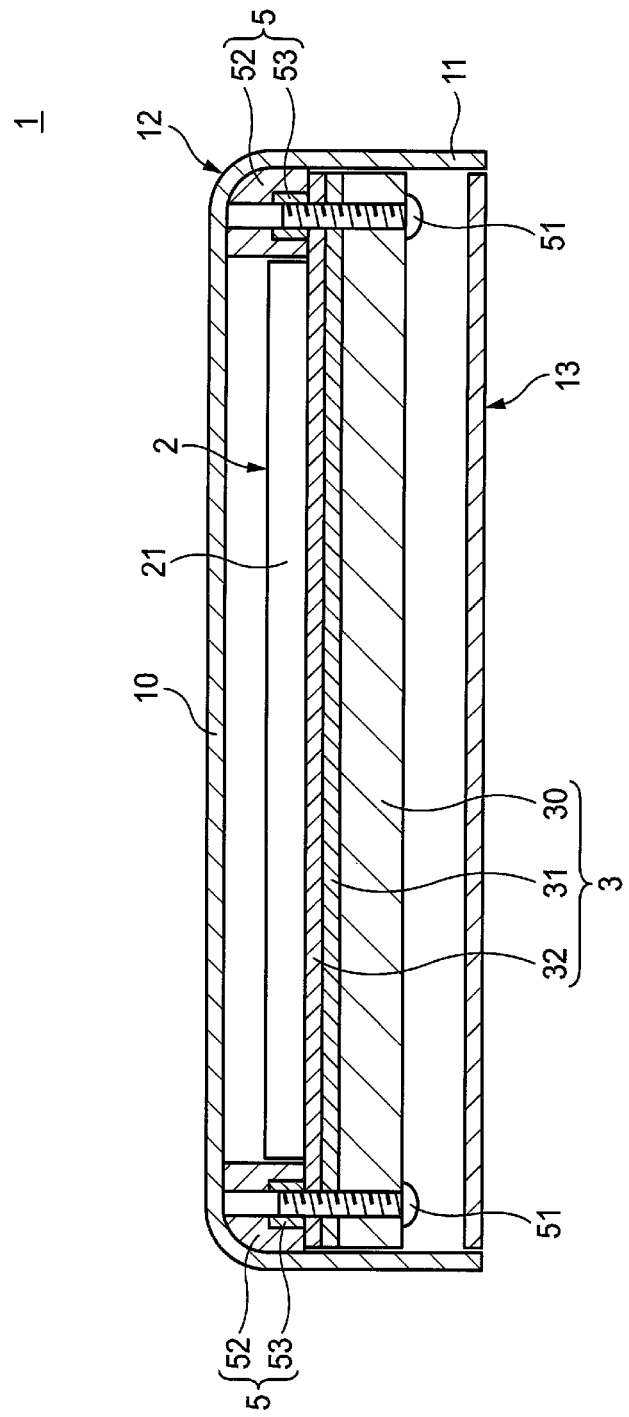
FIG. 3 is a cross sectional view illustrating the configuration of the cassette for radiographic imaging 1.

FIG. 3 is a cross sectional view illustrating the configuration of the cassette for radiographic imaging 1.

FPD 2 is supported by the base 3 in such a way that the image receiving part is attached to the front surface of the base 3 opposing the top plate part 10, and a circuit board 28 (see FIG. 1), on which the scan circuit 22, signal processing circuit 23 or the like is mounted, is attached to the rear surface of the base 3. The image receiving part 21 and the circuit board 28 are connected to each other using a flexible circuit board.

The base 3 includes a base material 30 having a relatively excellent rigidity. In the illustrated example, an X-ray shielding material 31 for shielding a circuit board attached to the rear surface of the base 3 from X-rays and a buffer material 32 are stacked on the base in this order. Further, the configuration of the base 3 is not limited to the stacked structure of the stacked materials as mentioned above, but the base 3 may include only the base material 30, or other stacked materials such as a heat conductive material for dissipating heat from the circuit board.

A buffer material may be provided between the circuit board 21 and the front member 12 to prevent the circuit board 21 from being damaged by load.

In consideration of strength-to-weight ratio, the base material 30 may be made, for example, of a light metal material such as aluminum or magnesium, or a resin material containing carbon fiber such as CFRP, and preferably a resin containing carbon fiber.

In addition, the X-ray shielding material 31 may be made, for example, of a heavy metal material such as lead, tungsten or molybdenum, which has high X-ray absorption capacity.

A buffer material 32 may be made, for example, of a resin material such as a silicone-based, or urethane-based foaming agent, which has high impact absorption capacity.

In the cassette for radiographic imaging 1, the base 3 is fixed to the front member 12. Hereinafter, the fixing structure of the base 3 will be described with reference to FIGS. 4 to 6.

Figure 4:
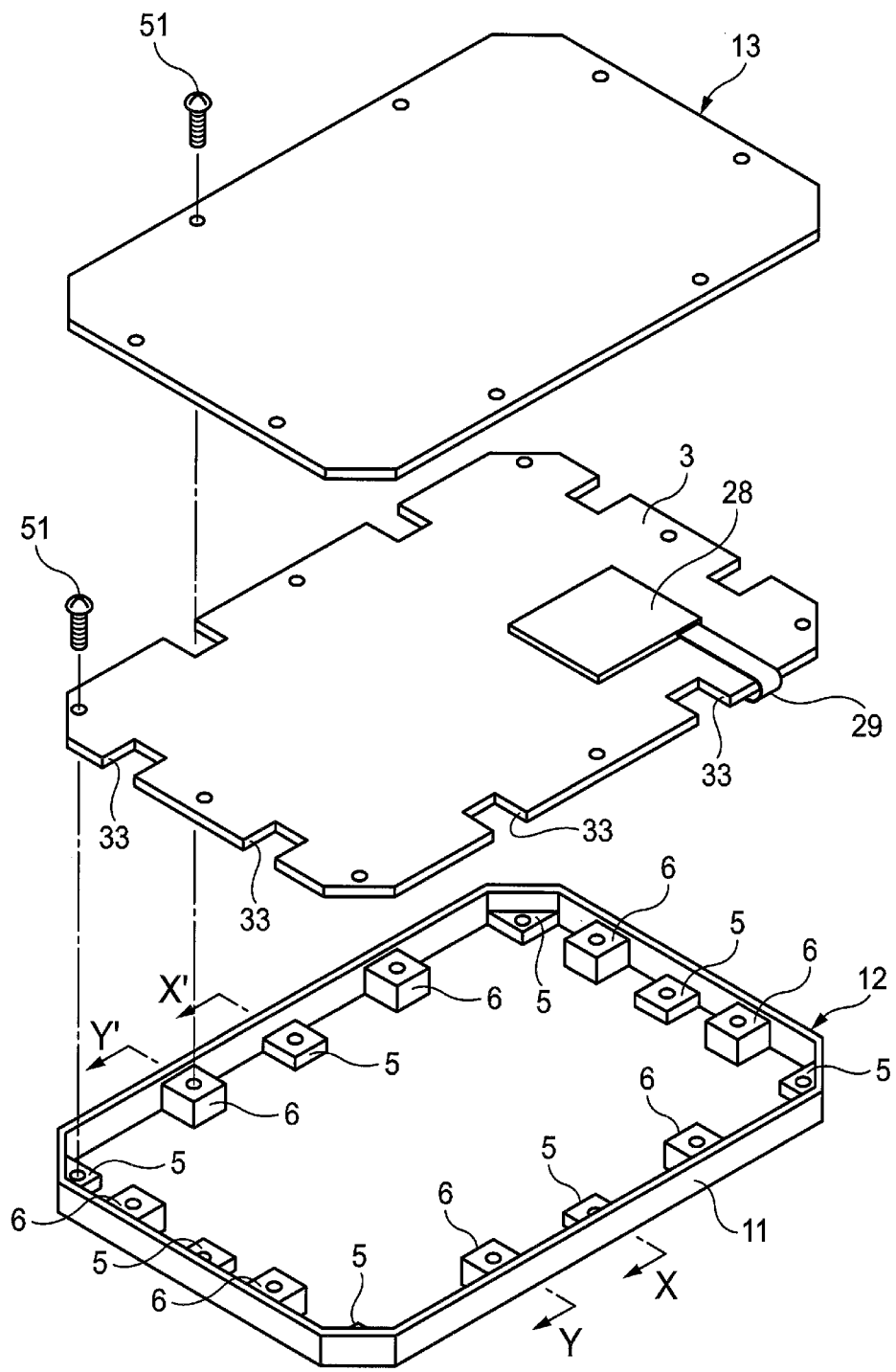
FIG. 4 is a perspective view illustrating a cassette for radiographic imaging 1 in FIG. 1 viewed from the reverse side thereof.
Figure 5:
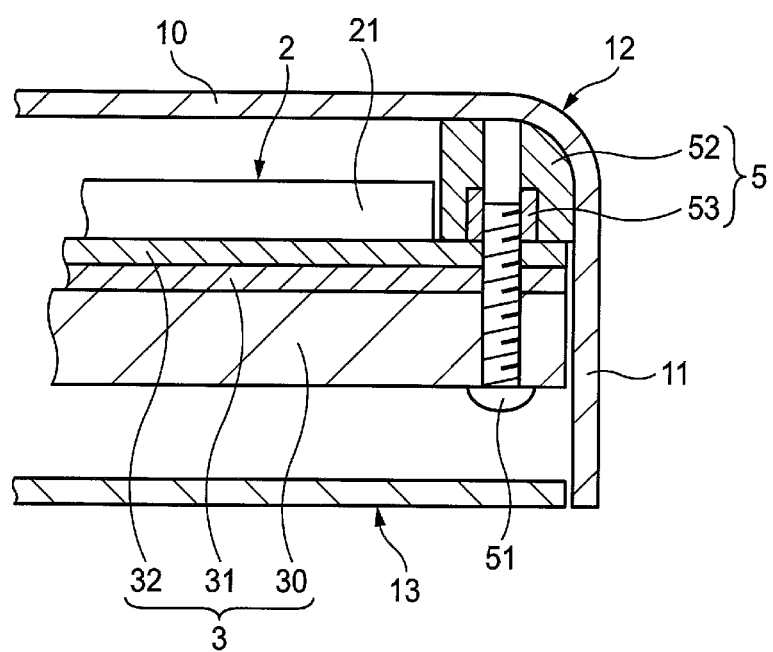
FIG. 5 is a cross sectional view taken along line X-X' in FIG. 4.
Figure 6A:
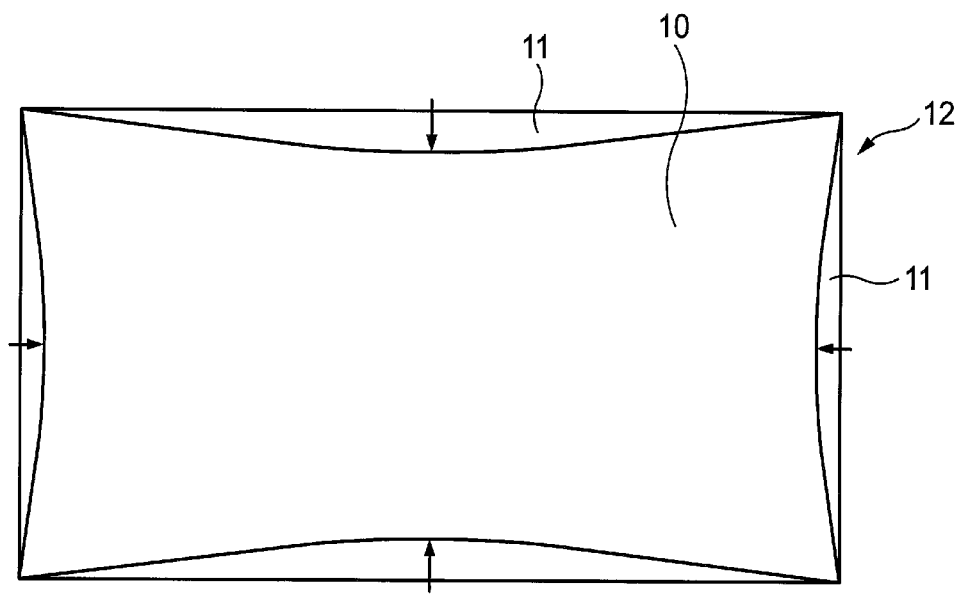
FIGS. 6A and 6B are views schematically illustrating a top plate part warped by load.
Figure 6B:
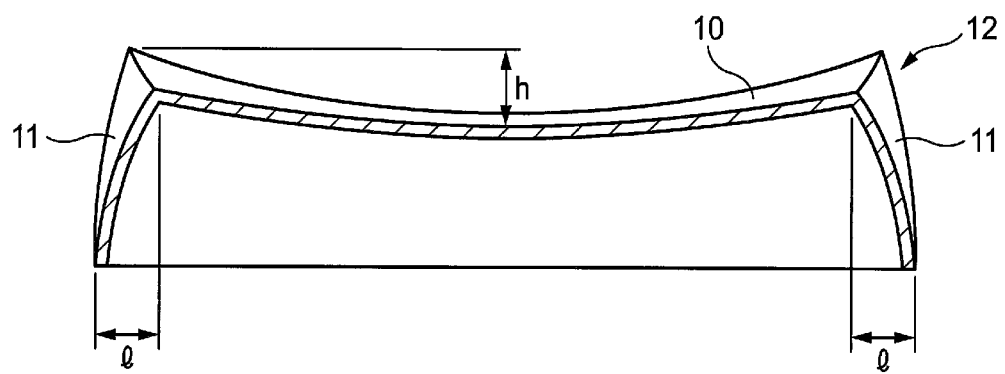

FIG. 4 is an exploded perspective view illustrating the cassette for radiographic imaging 1 in FIG. 1 as seen from the reverse side. FIG. 5 is a cross sectional view taken along the line X-X' in FIG. 4. FIG. 6 is a schematic view illustrating the top plate part 10 warped by load.

In FIG. 4, the front member 12 is provided with a plurality of pedestals 5 for fixing the base 3 with a distance from the top plate part 10. The pedestals 5 are provided at appropriate intervals along the side wall part 11. Each of the pedestals 5 is constituted with a holding member 52 which is attached to the top plate part 10, and a nut 53 which is held to the holding member 52.

In FIG. 5, the holding member 52, made of a resin material, is insert-molded in the front member 12 and attached to the top plate part 10. The nut 53 is embedded in the seating surface of the holding member 52 and held to the holding member 52. Further, the fixing of the nut 53 to the front member 12 is not limited to fixing by the holding member 52, and may be fixed, for example, by adhesion or welding.

The base 3 is coupled to the top plate part 10 of the front member 12 using the nut 53 of each of the pedestals 5 and a screw 51 which is paired with the nut 53.

As the base 3 is fixed to the front member 12 as described above, a closed box-like shape is formed by the base 3 and the front member 12. Accordingly, the warpage of the top plate part 10 of the front member 12 may be suppressed. Specifically, as the base 3 is fixed to the top plate part 10 of the front member 12, it can be ensured even further that the warpage of the top plate part 10 is suppressed.

In the illustrated example, the fixing position of the base 3 is provided in four corner portions and in each central part of four edges. When the top plate part 10 is warped, the amount of warpage h is typically the largest on the lines connecting the opposite angles of the top plate part 10. Therefore, by fixing the corner portions of the four edges of the base 3 to the corner portions of the four edges of the top plate part 10, it is possible to suppress the warpage of the top plate part 10 effectively. In addition, when the top plate part 10 is warped, the side wall part 11 falls down, and along with the fall-down, the edges of each side are displaced inwardly. The amount of displacement I is typically the largest in the central part of the edges, and thus, by fixing the central part of the edges of each side of the base 3 to the central part of the edges of each side of the top plate part 10, it is possible to regulate the displacement, thereby suppressing the warpage of the top plate part 10 effectively. Meanwhile, the fixing position of the base 3 is not limited to the illustrated example.

The base 3 preferably has a higher rigidity than the top plate part 10. As the base has a higher rigidity than the top plate part 10, it is ensured that the warpage of the top plate part 10 may be suppressed more effectively. For example, both the base material 30 constituting the base 3 and the top plate part 10 may be formed by a resin containing a carbon fiber. In the case of forming the base material 30 and the top plate part 10 with the same material, the thickness of the base material 30 is formed to be thicker than that of the top plate part 10, such that the base 3 including the base material 30 may have a higher rigidity than that of the top plate part 10.

In general, a cassette is fabricated to have a standard external size, and under the size restriction, the front member 12 is formed to be relatively thin in order to secure the biggest possible inner capacity of the case that accommodates FPD 2. Thus, the base 3 accommodated inside the case having a capacity secured thereby may be thicker, compared to the front member 12.

Figure 7:
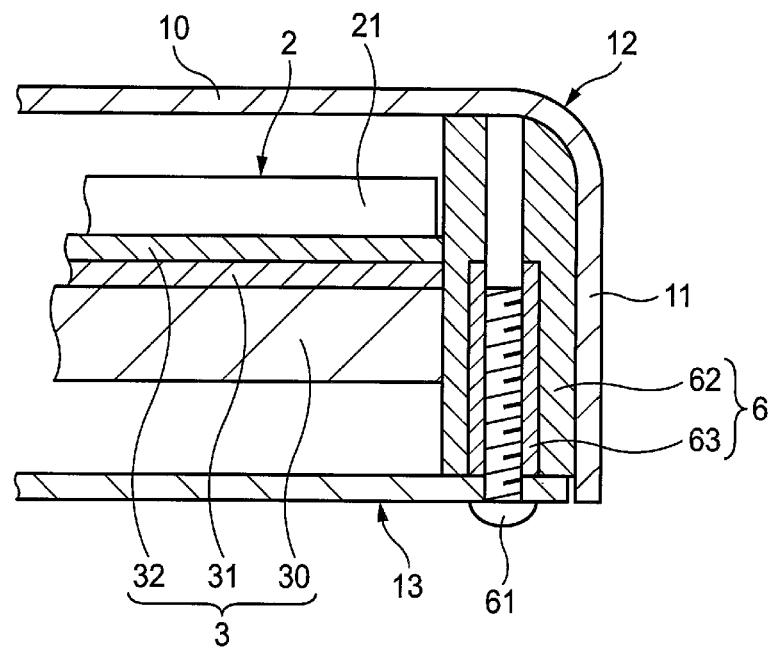
FIG. 7 is a cross sectional view taken along line Y-Y' in FIG. 4.

In the cassette for radiographic imaging 1, the back member 13 is also formed in the top plate part 10. Hereinafter, the fixing structure of the back member 13 will be described with reference to FIG. 4 and FIG. 7. FIG. 7 is a cross sectional view taken along the line Y-Y'.

The front member 12 is provided with a plurality of pedestals 6 for fixing the back member to fix the base 3 with a distance from the top plate part 10. The pedestals 6 for fixing the back member are provided appropriately between the adjacent pedestals 5 for fixing the base. Each of the pedestals 6 includes a holding member 62 attached to the top plate part 10, and a nut 63 held by the holding member 62. The holding member 62, made of a resin material, is insert-molded in the front member 12 and attached to the top plate part 10. The nut 63 is embedded in the seating surface of the holding material 62 and held by the holding material 62.

The height from the seating surface of the pedestals 6 for fixing the back member to the top plate part 10 is configured to be higher than the height from the seating surface of the pedestals 5 for fixing the base. The base 3 is provided with a cut-out part 33 so that the pedestals 6 for fixing the back member can be passed therethrough.

The back member 13 is coupled to the top plate part 10 using the nut 63 of each of the pedestals 6 and a screw 61 that pairs with the nut 63.

The back member 13 is fixed to the top plate part 10 of the front member 12 in such a way that the warpage of the top plate part 10 may be suppressed more effectively.

Further, in the example illustrated in FIG. 7, the back member 13 is inserted into the bottom part opening of the front member 12. As a result, a manufacturing process can be simplified, as the back member 13 is not required to be subjected to surface treatment such as flattening.

Figure 8:
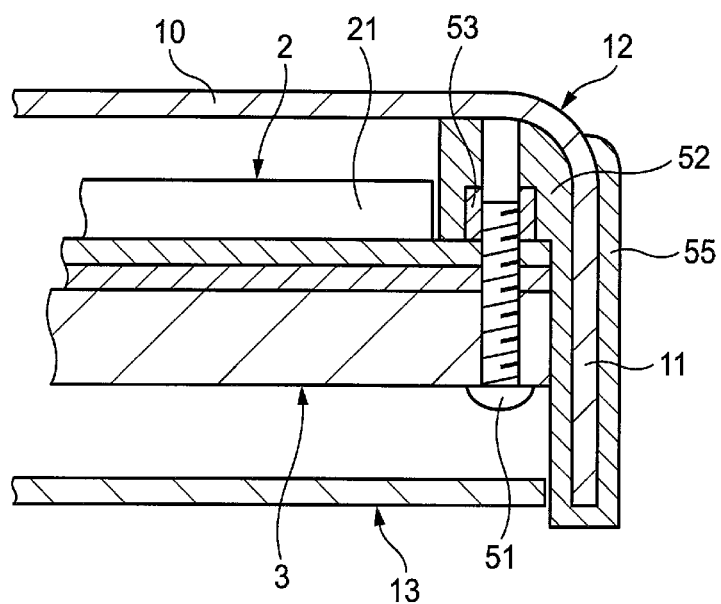
FIG. 8 is a view schematically illustrating a modified embodiment of a holding member of the cassette for radiographic imaging 1.
Figure 9:
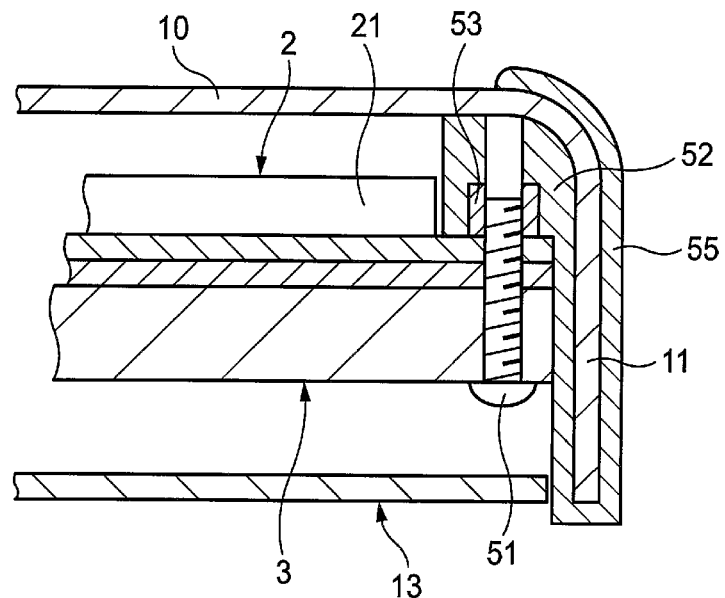
FIG. 9 is a view schematically illustrating a modified embodiment of a holding member of the cassette for radiographic imaging 1.

FIGS. 8 and 9 are modified examples of the holding member 52 of the cassette for radiographic imaging 1.

Each of the holding members 52 that holds the nut 53 for fixing the base 3 to the front member 12 is insert-molded in the front member 12. The holding members 52 may be provided integrally with a protection part 55 that covers the edges and outer surface around the entire circumference of the side wall part 11 of the front member 12. By the protection part 55, abrasion resistance or flame retardancy of the side wall part 11 may be improved, thereby enhancing strength of the cassette for radiographic imaging 1.

Examples of a resin material used to form the protection part 55 include a thermoplastic resin, and thermoplastic polyester elastomer, or a resin containing glass fiber is preferred because of excellent formability, heat resistance and elasticity.

In addition, in the example illustrated in FIG. 9, the protection part 55 is provided beyond the corner portion formed by the surface of the top plate part 10 and the surface of the side wall part 11, to partially cover the top plate part 10. Thus, the corner portion of the cassette for radiographic imaging can be prevented from directly touching a patient. Further, as the pressure applied to the corner portion is dispersed, it is possible to enhance the strength of the cassette for radiographic imaging.

Further, the front member 12, the back member 13 and the protection part 55 may be painted with a paint, such as a clear paint and the like, because this improves the abrasion resistance.

Figure 10:
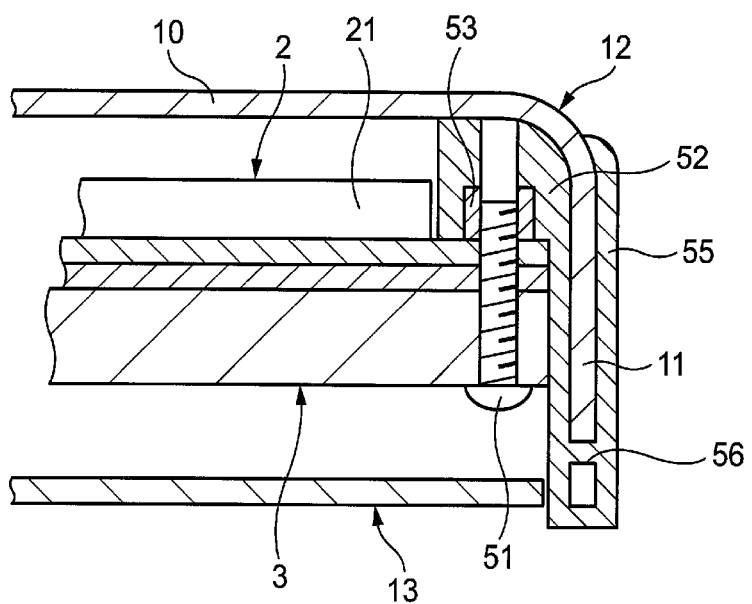
FIG. 10 is a view schematically illustrating a modified embodiment of a holding member of the cassette for radiographic imaging 1.

FIG. 10 illustrates a modified embodiment of the holding member 52 in the cassette for radiographic imaging 1. Further, like reference numerals refer to like parts in the above-described cassette for radiographic imaging 1, and descriptions thereof will be omitted or simplified.

In the example illustrated in FIG. 10, at least one through-hole 56 is formed at the side wall part 11 in the front member 12 to extend from the inner surface to the outer surface thereof. The protection part 55 is engaged with the inner surface of the side wall part 11 through each through-hole 56. With this arrangement, the protection part 55, and the holding member 52 which is integrally connected with the protection part 55 may be prevented from coming out of the front member 12 even by an impact or torsion.

Figure 11:
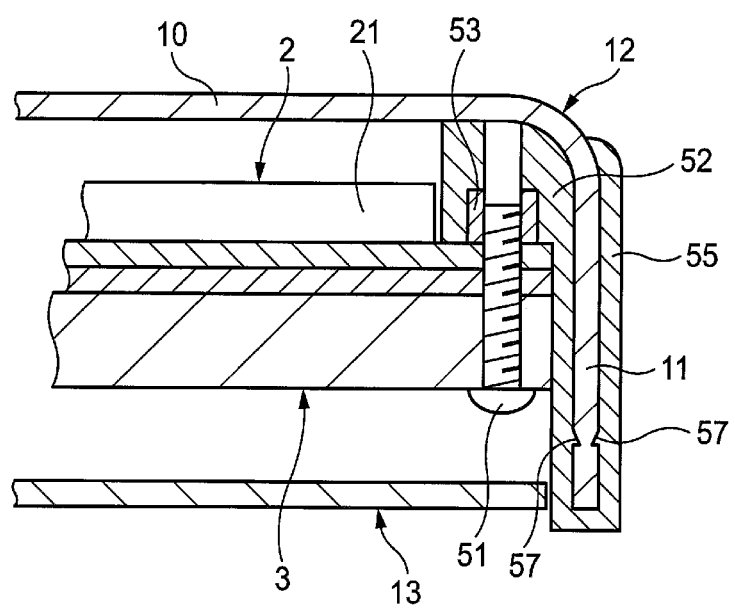
FIG. 11 is a view schematically illustrating a modified embodiment of a holding member of the cassette for radiographic imaging 1.

Further, FIG. 11 illustrates a cassette for radiographic imaging 1 which is provided with a notch on at least one of the inner surface and the outer surface of the side wall part 11 of the front member 12. Further, like reference numerals refer to like parts in the above-described cassette for radiographic imaging 1, and descriptions thereof will be omitted or simplified.

In the example illustrated in FIG. 11, at least one of the inner surface and outer surface of the side wall part 11 is provided with a notch 57, to allow the protection part 55 to be engaged with the front member 12. The notch 57 may be formed around the entire circumference of at least one of the inner surface and outer surface of the side wall part 11, or may be formed at a part thereof. With this arrangement, the protection part 55, and the holding member 52 which is integrally connected with the protection part 55, may be prevented from coming off the front member 12 even by an impact or torsion.

In addition, as another form of a cassette for radiographic imaging, the holding member 52 may be provided with a hook on a surface contacting at least one of the inner surface and outer surface of the side wall part 11 in the front member 12. By the hook and the notch 57, the front member 12 and the holding member 52 may be coupled together.

In the above embodiments, the FPD is used as an X-ray imaging recording medium. However, as an X-ray image recording medium, a combination of an intensifying screen which generates fluorescence when exposed to X-rays and a film photosensitive to the fluorescence may be used. Alternatively, a photostimulable phosphor (accumulative phosphor) panel, which accumulates the intensity distributions of X-rays as latent images when exposed to X-rays, and emits fluorescence in accordance with the latent images by subsequent irradiation of excitation light such as laser, may also be used.

Further, although a conventional X-ray is used as radiation in the above exemplary embodiments, the present invention is not limited thereto, and may be applicable to the case of using α-rays, γ-rays, and the like, other than X-rays.

As described above, a cassette for radiographic imaging of (1) to (11) set forth below is disclosed in the specification.

(1) A cassette for radiographic imaging, including:
a radiological image recording medium that detects radiation;
a base portion that supports the radiological image recording medium; and
a case that accommodates the radiological image recording medium and the base portion,
wherein the case includes a front member and a back member,
the front member includes a top plate part to which radiation is incident and a side wall part which is vertically formed around an entire circumference of the edges of the top plate part, where the top plate part and the side wall part are integrally formed by the same material,
the back member is configured to close a bottom part opening of the front member, and
the base portion is fixed to the front member.

(2) The cassette for radiographic imaging according to (1), wherein the base portion is fixed to the top plate part.

(3). The cassette for radiographic imaging according to (2), wherein the top plate part and the base portion are formed in a substantially rectangular shape, and the base portion is fixed to the top plate part in at least four corner portions of the base portion.

(4) The cassette for radiographic imaging according to any one of (1) to (3), wherein the base portion has a rigidity higher than a rigidity of the top plate part.

(5) The cassette for radiographic imaging according to any one of (1) to (4), wherein the back member is fixed to the top plate part.

(6) The cassette for radiographic imaging according to any one of (1) to (5), wherein the front member and the base portion are coupled with a pair of coupling members at a fixing position of each of the front member and the base portion, and
one of the pair of the coupling members is held by a holding member formed by a resin material which is insert-molded in the front member.

(7) The cassette for radiographic imaging according to (6), wherein the holding member is provided with a protection part configured to cover edges of the side wall part and outer surface of the side wall part around the entire circumference of the side wall part.

(8) The cassette for radiographic imaging according to (7), wherein the side wall part is provided with at least one through-hole configured to extend from an inner surface of the side wall part to the outer surface of the side wall part, and the protection part is engaged with the inner surface of the side wall part through each through-hole.

(9). The cassette for radiographic imaging according to any one of (1) to (8), wherein the back member is embedded in a bottom part opening of the front member.

(10) The cassette for radiographic imaging according to any one of (1) to (9), wherein the front member is formed of a resin containing a carbon fiber.

(11) The cassette for radiographic imaging according to any one of (1) to 10, wherein the base portion is formed of a resin containing a carbon fiber.

What is claimed is:

1. A cassette for radiographic imaging, comprising:
   a radiological image recording medium that detects radiation;
   a base portion that supports the radiological image recording medium; and
   a case that accommodates the radiological image recording medium and the base portion,
   wherein the case includes a front member and a back member,
   the front member includes a top plate part to which radiation is incident and a side wall part which is vertically formed around an entire circumference of the edges of the top plate part, where the top plate part and the side wall part are integrally formed by the same material,
   the back member is configured to close a bottom part opening of the front member, and
   the base portion is fixed to the front member.

2. The cassette for radiographic imaging according to claim 1, wherein the base portion is fixed to the top plate part.

3. The cassette for radiographic imaging according to claim 2, wherein the top plate part and the base portion are formed in a substantially rectangular shape, and the base portion is fixed to the top plate part in at least four corner portions of the base portion.

4. The cassette for radiographic imaging according to claim 2, wherein the base portion has a rigidity higher than a rigidity of the top plate part.

5. The cassette for radiographic imaging according to claim 2, wherein the back member is fixed to the top plate part.

6. The cassette for radiographic imaging according to claim 2, wherein the front member and the base portion are coupled with a pair of coupling members at a fixing position of each of the front member and the base portion, and
   one of the pair of the coupling members is held by a holding member formed by a resin material which is insert-molded in the front member.

7. The cassette for radiographic imaging according to claim 2, wherein the back member is embedded in a bottom part opening of the front member.

8. The cassette for radiographic imaging according to claim 2, wherein the front member is formed of a resin containing a carbon fiber.

9. The cassette for radiographic imaging according to claim 2, wherein the base portion is formed of a resin containing a carbon fiber.

10. The cassette for radiographic imaging according to claim 1, wherein the base portion has a rigidity higher than a rigidity of the top plate part.

11. The cassette for radiographic imaging according to claim 1, wherein the back member is fixed to the top plate part.

12. The cassette for radiographic imaging according to claim 1, wherein the front member and the base portion are coupled with a pair of coupling members at a fixing position of each of the front member and the base portion, and
    one of the pair of the coupling members is held by a holding member formed by a resin material which is insert-molded in the front member.

13. The cassette for radiographic imaging according to claim 12, wherein the holding member is provided with a protection part configured to cover edges of the side wall part and outer surface of the side wall part around the entire circumference of the side wall part.

14. The cassette for radiographic imaging according to claim 13, wherein the side wall part is provided with at least one through-hole configured to extend from an inner surface of the side wall part to the outer surface of the side wall part, and the protection part is engaged with the inner surface of the side wall part through each through-hole.

15. The cassette for radiographic imaging according to claim 1, wherein the back member is embedded in a bottom part opening of the front member.

16. The cassette for radiographic imaging according to claim 1, wherein the front member is formed of a resin containing a carbon fiber.

17. The cassette for radiographic imaging according to claim 1, wherein the base portion is formed of a resin containing a carbon fiber.

* * * * *